United States Patent
Rochedreux

(10) Patent No.: US 11,458,480 B2
(45) Date of Patent: *Oct. 4, 2022

(54) GROOVED CHAMBER FOR A FOOD-PRODUCT SEPARATION MACHINE

(71) Applicant: PROVISUR TECHNOLOGIES, INC., Chicago, IL (US)

(72) Inventor: Philippe Henri Rochedreux, Douamenez (FR)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,976

(22) Filed: Dec. 4, 2020

(65) Prior Publication Data

US 2021/0086192 A1   Mar. 25, 2021

Related U.S. Application Data

(63) Continuation of application No. 16/244,989, filed on Jan. 10, 2019, now Pat. No. 10,888,872.

(60) Provisional application No. 62/643,844, filed on Mar. 16, 2018.

(51) Int. Cl.
   *B02C 18/30*   (2006.01)

(52) U.S. Cl.
   CPC ...... *B02C 18/301* (2013.01); *B02C 2018/308* (2013.01)

(58) Field of Classification Search
   CPC ....... B02C 18/00; B02C 18/30; B02C 18/301; B02C 2018/301
   USPC ...................................................... 452/135
   See application file for complete search history.

(56) References Cited

U.S. PATENT DOCUMENTS

| 3,524,487 | A | * | 8/1970 | Paoli | B02C 18/00 241/68 |
| 3,659,638 | A | * | 5/1972 | Paoli | B02C 18/00 241/74 |
| 3,739,994 | A | * | 6/1973 | McFarland | A22C 17/04 241/74 |
| 3,857,518 | A | * | 12/1974 | Paoli | A22C 17/04 241/68 |

(Continued)

FOREIGN PATENT DOCUMENTS

| EP | 0700639 A1 | 3/1996 |
| EP | 0700639 B1 | 12/1999 |

OTHER PUBLICATIONS

International Search Report and Written Opinion of corresponding International Patent Application No. PCT/US18/67678 dated Apr. 1, 2019, 8 pages.

(Continued)

*Primary Examiner* — Richard T Price, Jr.
(74) *Attorney, Agent, or Firm* — Klintworth & Rozenblat IP LLP

(57) ABSTRACT

A separation assembly for a food product separating machine configured to separate meat product from bone product includes a separation chamber defined by a circumferential side wall, a longitudinal axis, and a radius. The separation chamber includes a plurality of apertures disposed in the circumferential side wall and at least one V-shaped groove disposed along an inner surface of the circumferential side wall. The V-shaped groove is defined by a vertex and an angle bisector of the vertex and is formed in an inner surface of the chamber.

26 Claims, 7 Drawing Sheets

(56) References Cited

U.S. PATENT DOCUMENTS

| | | | | |
|---|---|---|---|---|
| 4,189,104 | A | * | 2/1980 | dos Santos ............ A22C 17/04 |
| | | | | 241/82.3 |
| 5,251,829 | A | * | 10/1993 | Lesar .................... B02C 18/302 |
| | | | | 241/30 |
| 5,289,979 | A | * | 3/1994 | Lesar .................... B02C 18/302 |
| | | | | 241/260.1 |
| 5,344,086 | A | * | 9/1994 | Lesar .................... B02C 18/302 |
| | | | | 241/260.1 |
| 5,580,305 | A | * | 12/1996 | McFarland ............ A22C 17/04 |
| | | | | 241/74 |
| 5,813,909 | A | * | 9/1998 | Goldston ............... A22C 17/04 |
| | | | | 452/138 |
| 6,622,950 | B1 | | 9/2003 | Fleming et al. |
| 7,461,800 | B2 | | 12/2008 | Lesar et al. |
| 7,896,730 | B2 | | 3/2011 | Lesar |
| 9,107,426 | B2 | | 8/2015 | Eisiminger |
| 2007/0254571 | A1 | | 11/2007 | Gladh |
| 2011/0248109 | A1 | | 10/2011 | Lesar et al. |
| 2015/0108261 | A1 | | 4/2015 | Metcalf et al. |
| 2015/0201630 | A1 | | 7/2015 | Hancock |
| 2016/0030943 | A1 | | 2/2016 | York |

OTHER PUBLICATIONS

International Search Report and Written Opinion of corresponding International Patent Application No. PCT/US18/67678 dated Apr. 1, 2019, 13 pages.
Machine English translation of EP0700639.

* cited by examiner

GROOVED CHAMBER FOR A FOOD-PRODUCT SEPARATION MACHINE

CROSS-REFERENCE TO RELATED APPLICATIONS

This patent application is a Continuation of U.S. patent application Ser. No. 16/244,989, filed Jan. 10, 2019, which claims the benefit of U.S. Provisional Patent Application Ser. No. 62/643,844, filed on Mar. 16, 2018, the entire contents of which applications are incorporated by reference in their entirety.

BACKGROUND OF THE INVENTION

This disclosure relates to a separating machine for food products, such as meat, and more particularly, to a recovery system having a separation chamber with an interior grooved configuration.

A typical separation machine includes a hopper that receives material to be separated with respect to a combination of meat and bone product, and an advancement mechanism, such as a rotatable auger that conveys the material away from the hopper toward a separation chamber. The separation chamber is typically coupled to a downstream discharge opening or outlet having a valve or ring valve that controls pressure build-up within the separation chamber.

Systems have been developed for the purpose of separating hard material, such as bone and bone fragments, from soft material, such as meat product. Representative hard material collection systems are shown and described in U.S. Pat. No. 7,461,800 issued Dec. 9, 2008 and assigned to Weiler & Co.; U.S. Pat. No. 5,344,086 issued Sep. 6, 1994 and assigned to Weiler & Co.; U.S. Pat. No. 5,289,979 issued Mar. 1, 1994 and assigned to Weiler & Co.; and U.S. Pat. No. 5,251,829 issued Oct. 12, 1993 and assigned to Weiler & Co., the entire disclosures of which are hereby incorporated by reference. Typically, hard material collection systems of this type route the hard material in a downstream direction for discharge, while soft material exits through apertures in the separation chamber.

However, such systems are relatively inefficient with respect to moving the combination of hard and soft material in the downstream direction because the auger that rotates within the separation chamber tends to cause the food mass to spin within the separation chamber and not move efficiently in the downstream direction.

SUMMARY OF THE INVENTION

In accordance with embodiments of present invention, a separation assembly for a food product separating machine configured to separate meat product from bone product includes a separation chamber defined by a circumferential side wall, a longitudinal axis, and a radius. The separation chamber includes a plurality of apertures disposed in the circumferential side wall, and at least one V-shaped groove disposed along an inner surface of the circumferential side wall. The V-shaped groove is defined by a vertex, two legs extending from the vertex, and an angle bisector of the vertex, and is formed in an inner surface of the chamber such that the angle bisector is tilted relative to the radius of the chamber.

In another embodiment, a separation assembly for a food product separating machine for separating meat product from bone product includes a separation chamber defined by a circumferential side wall, a longitudinal axis, and a radius. The separation chamber includes a plurality of apertures disposed in the circumferential side wall and further includes a plurality of V-shaped grooves disposed along an inner surface of the circumferential side wall. Each V-shaped groove is defined by a vertex and an angle bisector of the vertex, and each of the V-shaped grooves is formed in the inner surface such that the angle bisector is tilted relative to the radius of the chamber.

In a further embodiment, a food product separating machine separates meat product from bone product in a mixed food product. The separating machine includes a food hopper configured to contain mixed food product and dispense the mixed food product from a hopper outlet disposed toward a bottom portion of the food hopper. An auger in communication with the hopper outlet receives the mixed food product dispensed from the hopper outlet at an upstream portion of the auger. A hollow cylindrical separation chamber receives a portion of the auger where the cylindrical separation chamber is defined by a circumferential side wall, a longitudinal axis, and a radius. The separation chamber further includes a plurality of apertures disposed in the circumferential side wall, and a plurality of V-shaped grooves disposed along an inner surface of the circumferential side wall, where the V-shaped grooves are defined by a vertex and an angle bisector of the vertex. The V-shaped grooves are formed in the inner surface such that the angle bisector is tilted relative to the radius of the chamber.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

DETAILED DESCRIPTION

The various features and advantageous details of the subject matter disclosed herein are explained more fully with reference to the non-limiting embodiments described in detail in the following description.

Figure 1:
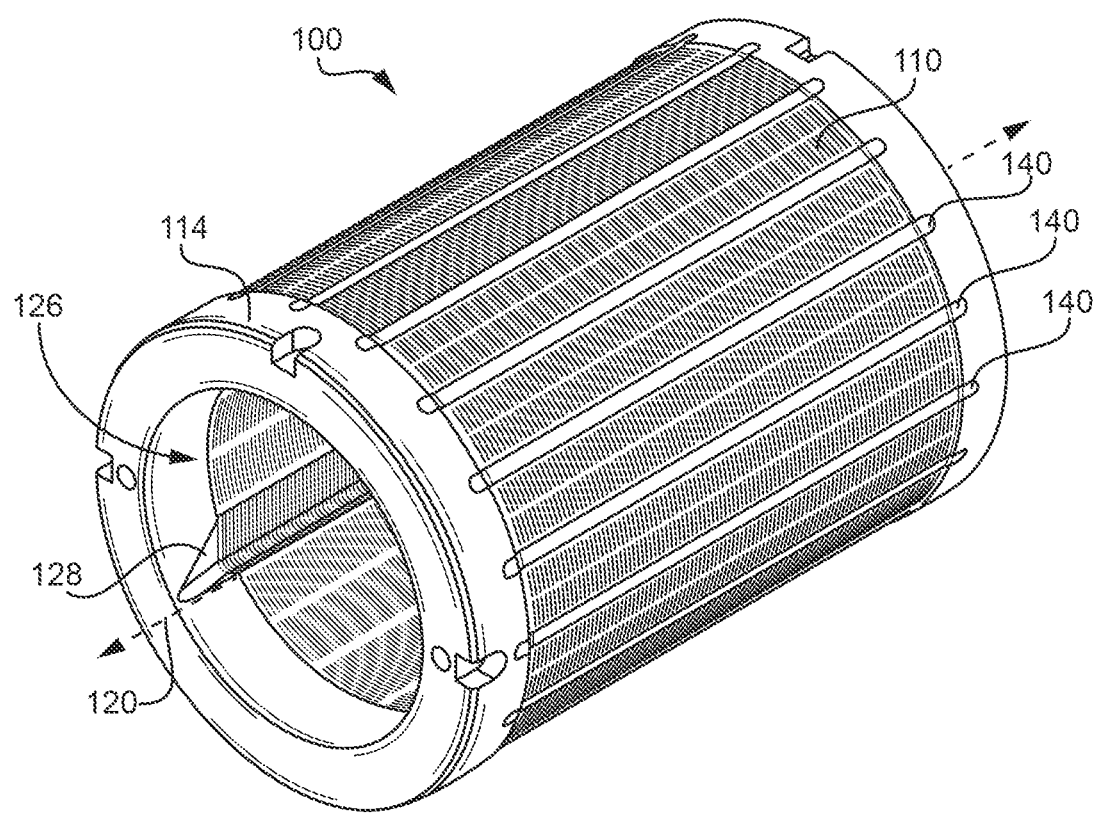
FIGS. 1-2 are perspective views of a separation chamber.
Figure 2:
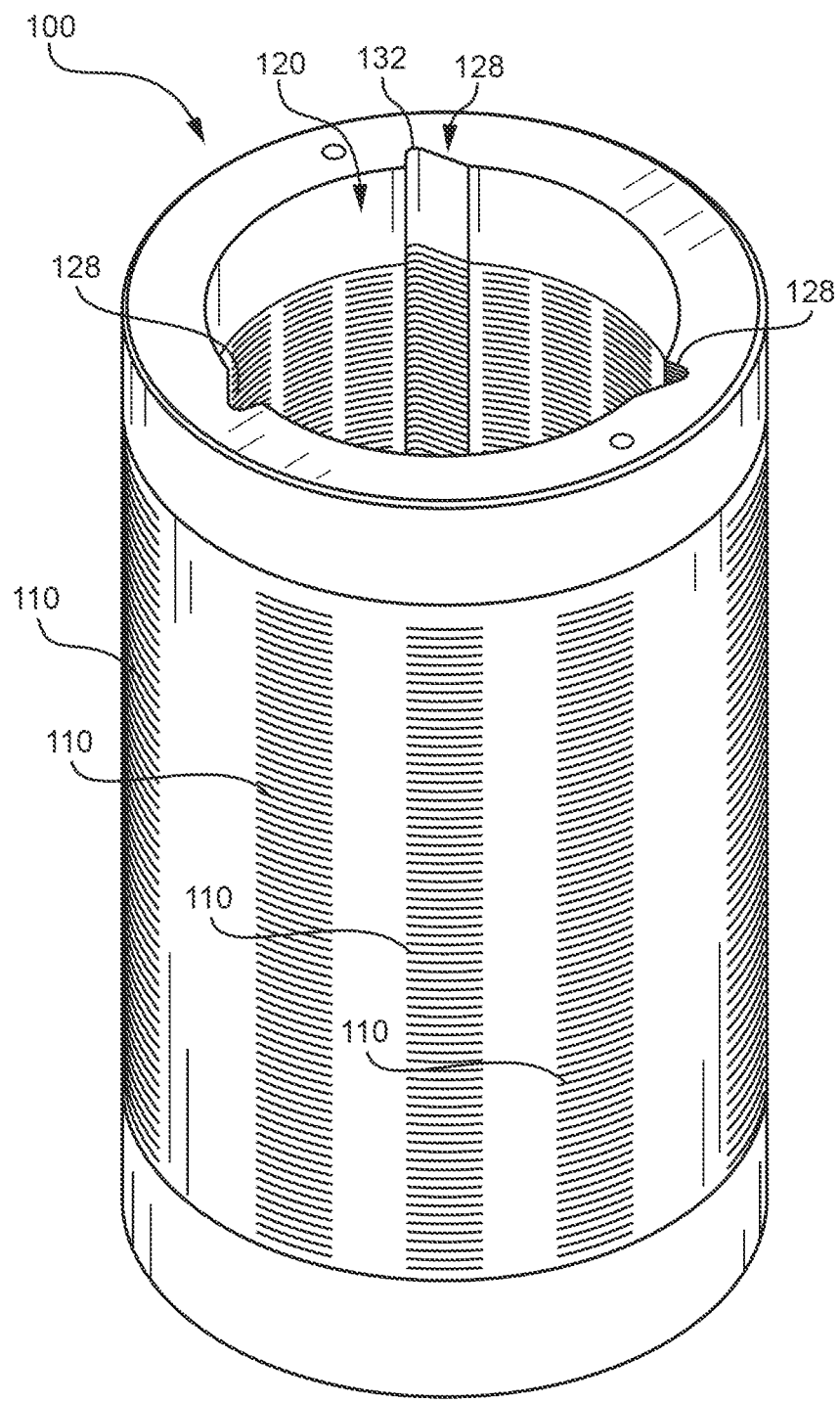
Figure 3:
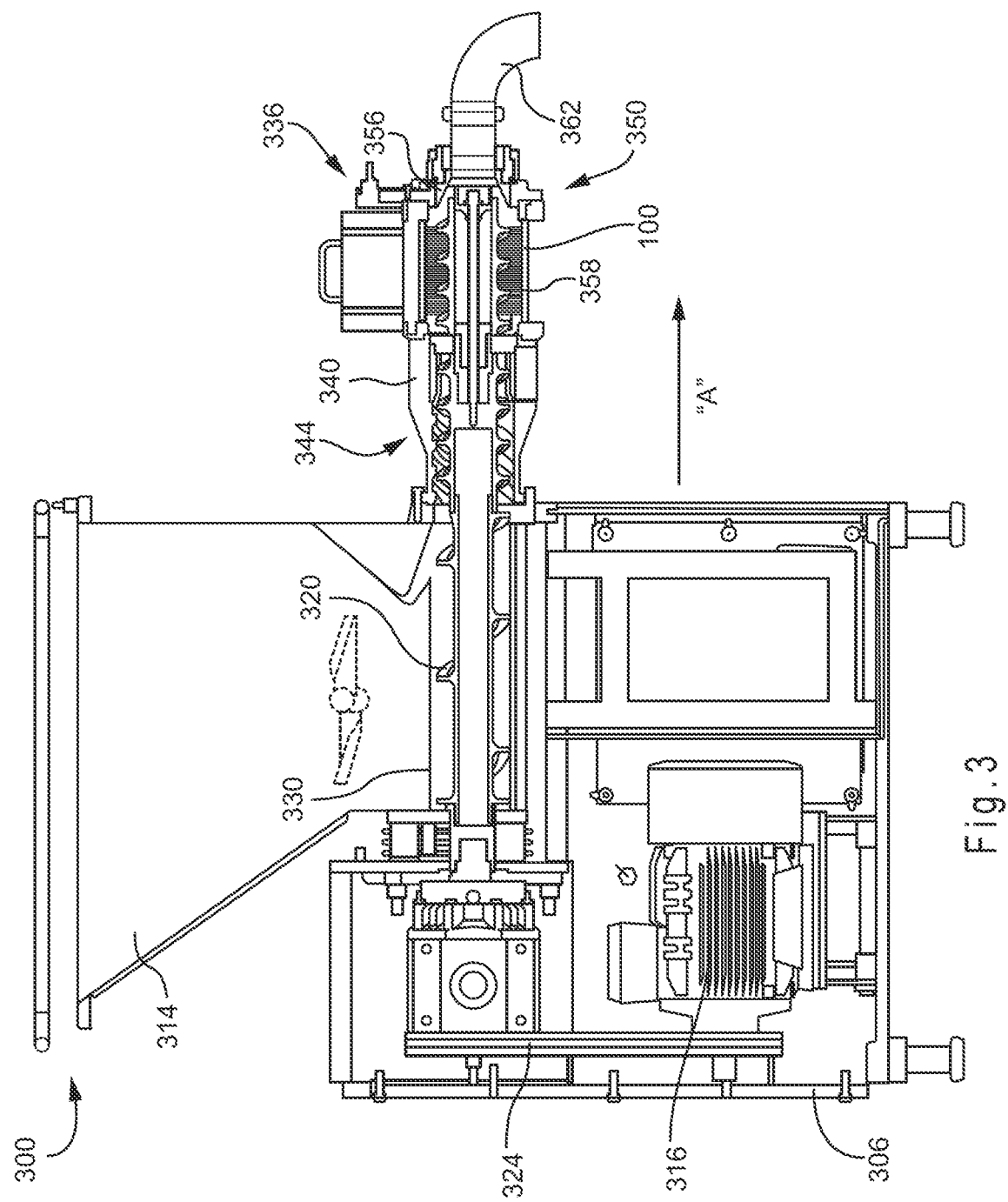
FIG. 3 is a side elevational view of a food product separation machine utilizing the separation chamber of FIGS. 1-2.
Figure 4:
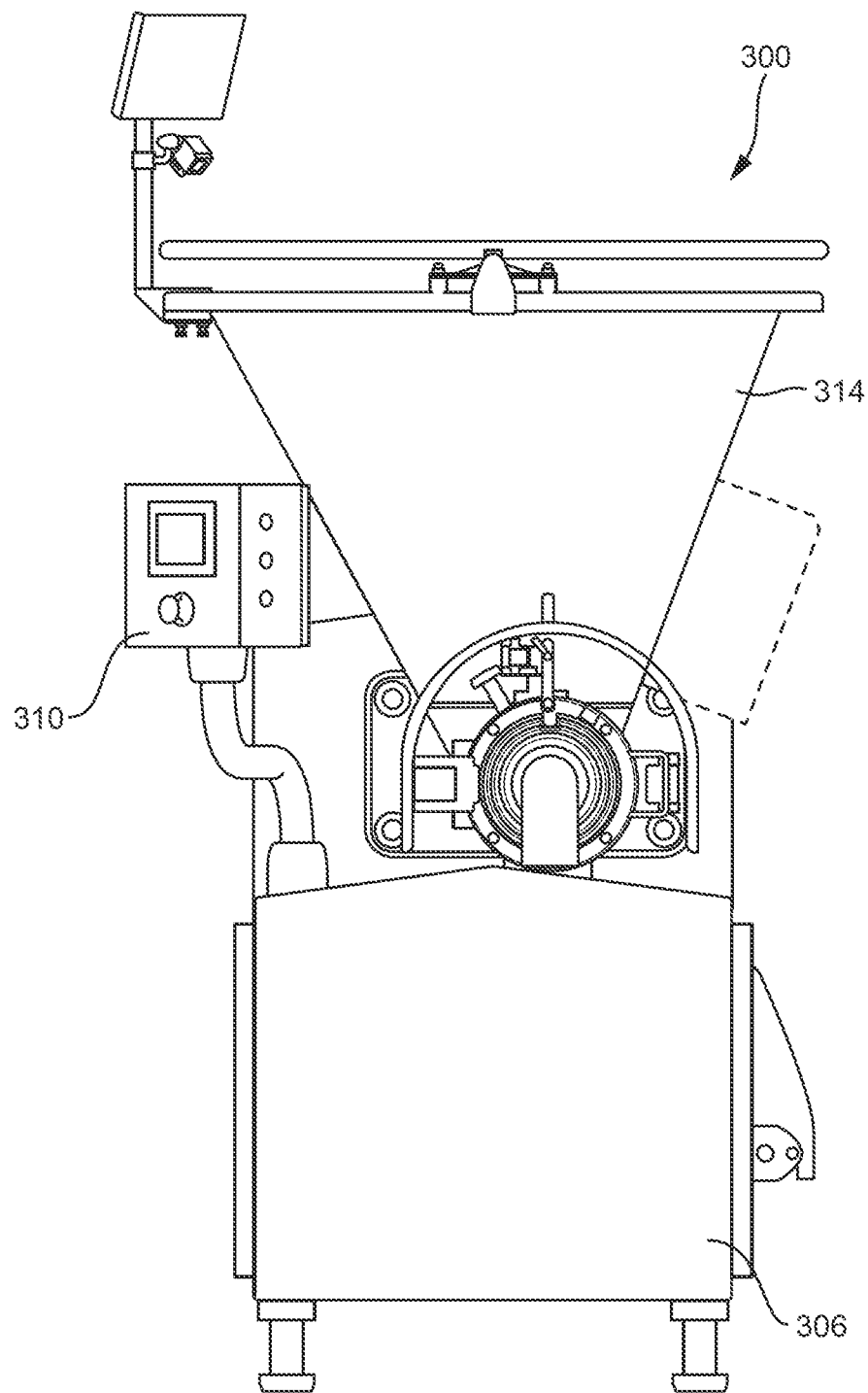
FIG. 4 is an end view of a food product separation machine of FIG. 3.
Figure 5:
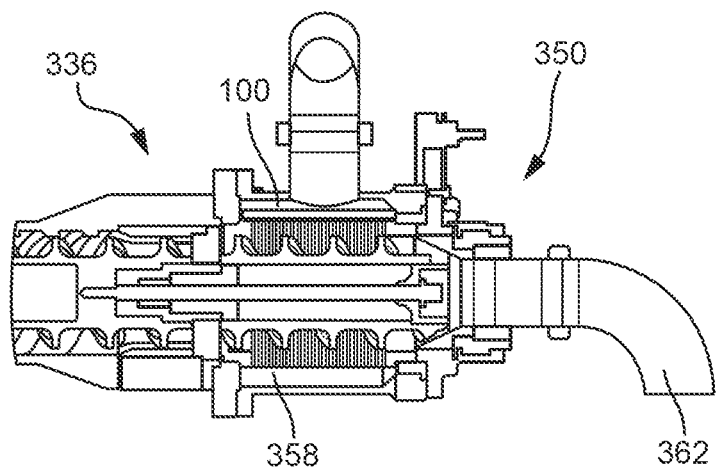
FIG. 5 is a side view of a separation assembly of the food product separation machine of FIGS. 3-4, shown in a closed compression position.

FIGS. 1-2 show a separation chamber 100 for use in a food separation machine 300 shown in FIGS. 3-5. The separation chamber 100 has a hollow cylindrical configuration, and may include a plurality of apertures or channel-like slits 110 disposed in a circumferential side wall 114 of the separation chamber 100. The apertures 114 are shown as rectangular in the figures, but may be any suitable shape. Preferably, the separation chamber 100 is cylindrical and has a constant diameter along its length. However, in other embodiments, the separation chamber 100 may have a somewhat conical or tapered shape (not shown), which may taper from an upstream location toward a downstream location.

As shown in FIGS. 3-5, the food separation machine 300 may include a platform or support 306, a controller 310, and a hopper 314 configured to receive a mass of food stuff, including meat product and bone and/or bone fragments. A motor 316 supported in the platform 306 powers an auger 320 via a belt 324, gear arrangement, or other means, and which auger 320 may be located under an opening 330 disposed at the bottom portion of the hopper 314. The meat product drops through an opening 330 at the bottom of the hopper 314 in communication with the auger 320. As the auger 320 rotates, the food product is transported in the downstream direction, shown by arrow A (FIG. 3), toward a separation assembly 336.

The separation assembly 336 may include a separation housing 340, an inlet portion 344, a bone pack outlet portion 350, a valve or ring valve 356 located proximal the bone pack outlet portion 350, a meat accumulation portion 358 coupled to a meat outlet portion 362, and the separation chamber 100. The auger 320 extends from under the hopper 314 and through the separation chamber 100 substantially along the entire length of the separation chamber 100.

In operation, as the auger 320 rotates, pressure builds up within the separation chamber 100 as the mass of food stuff moves in the downstream direction. The build-up of pressure is controlled or regulated by the valve or ring valve 356 at the downstream end of the separation chamber 100. The pressure within the separation chamber 100 forces soft material, such as meat, through the plurality of apertures 110 in the sidewall 114 of the separation chamber 100 and into the meat accumulation portion 358, which meat is then discharged through the meat outlet portion 362 for collection. Bone and bone fragments that are too large to exit through the plurality of apertures 110 and are carried downstream toward the bone pack outlet portion 350 for removal and disposal.

Referring back to FIGS. 1-2 and 6, the separation chamber 100 may be defined by the circumferential side wall 114, a longitudinal axis 120, and a radius R, best shown in FIG. 6. As discussed above, the plurality of apertures 110 disposed in the circumferential side wall 114 permit soft food product, such as meat, to pass therethrough under pressure as the auger 320 rotates. In one specific embodiment, the slots or apertures 110 may be arranged in columns along an axial length of the separation chamber 100, and such columns may be disposed evenly or unevenly about the circumference of the separation chamber 100. Although the apertures 110 are shown as slots or channels in the drawings, the plurality of apertures 110 may be any suitable shape, such as circular, polygonal, and the like.

An interior portion 126 of the separation chamber 100 may include at least one V-shaped groove 128 disposed along an inner surface of the circumferential side wall 114. The V-shaped groove 128 may be defined by a vertex 132, two legs extending from the vertex, and an angle bisector 134 (FIG. 8) of the vertex 132. The V-shaped grooves 128 and may be formed in the inner surface of the separation chamber 100 and further may run along substantially an entire length of the separation chamber 100. The V-shaped grooves 128 may facilitate downstream movement of the mass of food stuff because as the auger 320 rotates, the food stuff is forced into the V-shaped grooves 128 and under pressure, and may move downstream in the direction of auger rotation. The auger 320 proximal to the walls of the V-shaped grooves 128 tend to "scrape" the mass of food product to induce downstream movement. In known chambers having a smooth internal structure, meaning without internal grooves, the mass of food product tends to rotate internally as the auger rotates without advancing downstream to the same degree as the auger advances.

Although three V-shaped grooves 128 are shown in the drawings, any suitable number of V-shaped grooves 128 may be formed. In one embodiment, the V-shaped grooves 128 may run parallel to the longitudinal axis 120 of the separation chamber 100 along a length of the V-shaped groove 128. In another embodiment, the V-shaped grooves 128 may run along a helical path (not shown) along a length of the chamber. Note that the vertex of the V-shaped groove is smooth or rounded rather than sharp or pointed so as to avoid "trapping" food product.

As shown in the figures, each of the V-shaped grooves 128 may have a constant cross-sectional shape along its length. As discussed above, each V-shaped groove 128 may be defined by its vertex 132 and its angle bisector 134. Preferably, each V-shaped groove 128 subtends an angle of about 60 degrees, but in alternate embodiments, each V-shaped groove 128 may subtend an angle of about between 25 degrees and 100 degrees.

Figure 6:
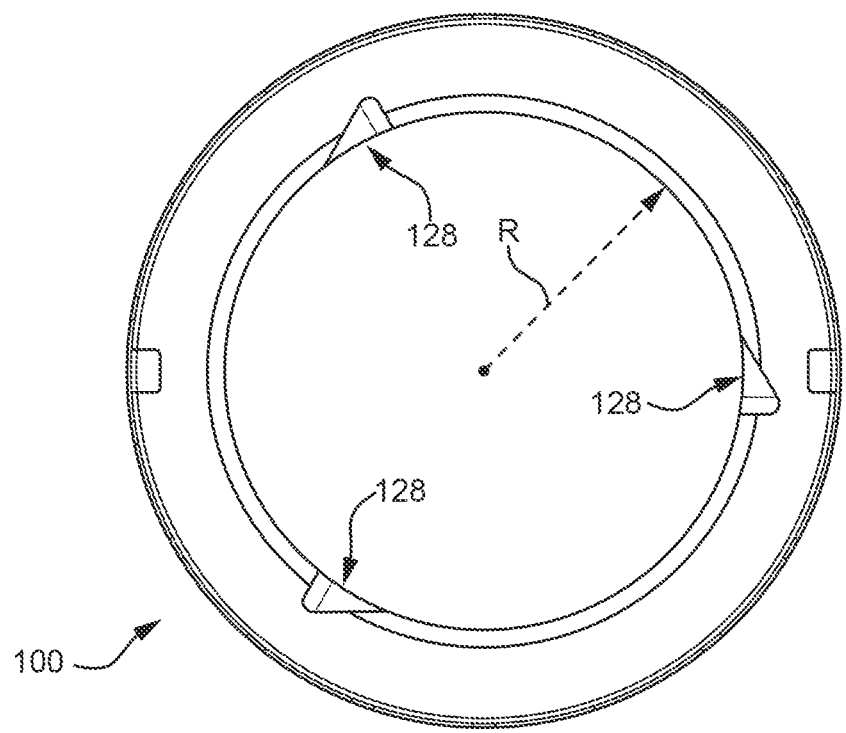
FIGS. 6-7 show sectional end views of the separation chamber of FIGS. 1-2.
Figure 7:
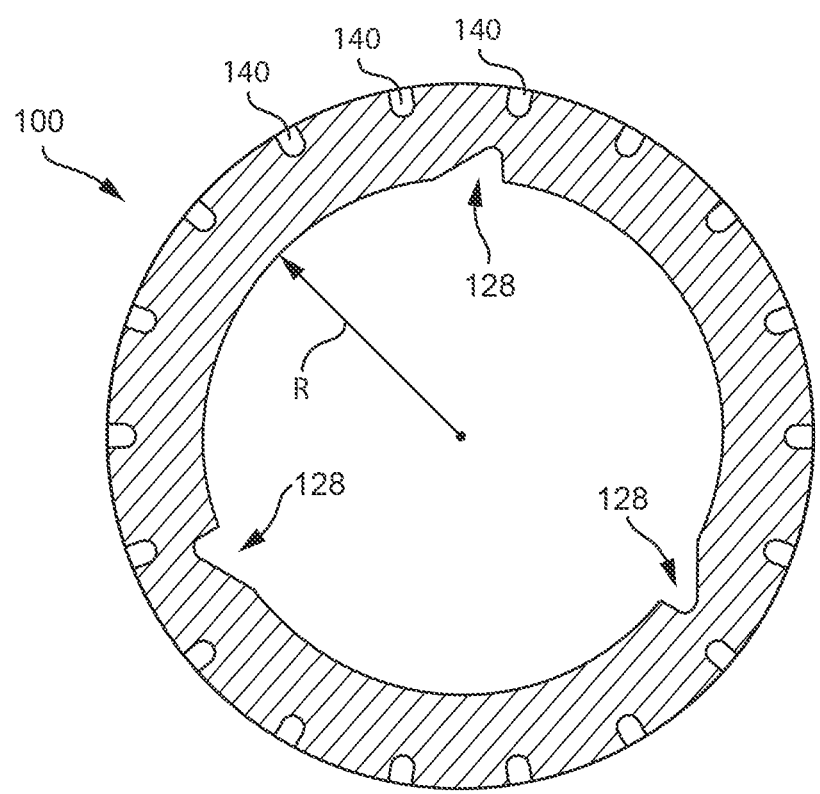
Figure 8:
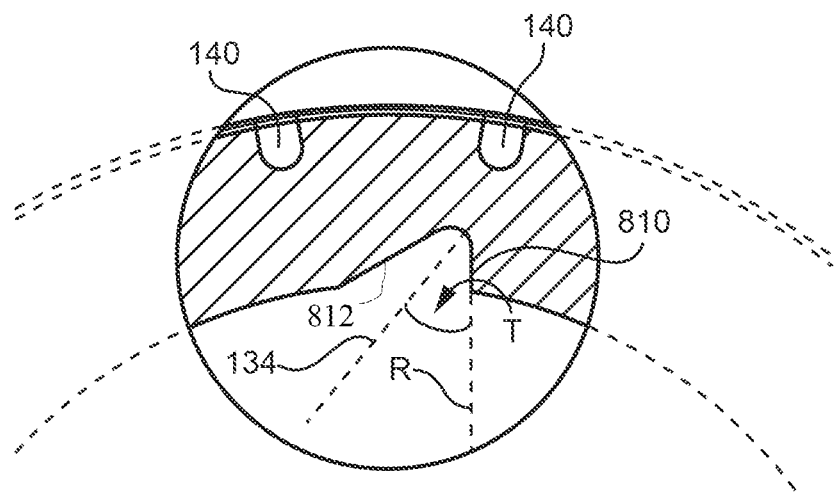
FIG. 8 is an enlarged sectional end view of a portion of the separation chamber of FIGS. 6-7, particularly showing the cross-sectional shape of the grooves.

As shown in greater detail in FIGS. 6-8, the angle bisector 134 may be tilted relative to the radius R of the separation chamber 100, where such tilt is shown to be in a plane perpendicular to the longitudinal axis 120 of the separation chamber 100. The angle bisector 134 may be tilted by any suitable angular amount. Preferably, the angle of tilt (T, see FIG. 8), may be about 30 degrees, but in alternate embodiments, the angle of tilt T relative to the radius R of the separation chamber 100 may be between 0 degrees and about 45 degrees relative to the radius R. As shown in the figures, the V-shaped groove 128 may be further defined by two legs extending from the vertex, namely a shorter leg 810 and a longer leg 812. Preferably, the shorter leg 810 of the V-shaped groove 128 is aligned along the radius R of the separation chamber 100, which facilitates scraping off the food product and urging the food product in the downstream direction. This is best shown in FIG. 8.

The separation chamber 100 may be formed from a casting or may be milled from a single piece. Alternatively, the separation chamber 100 may be formed from a plurality of thin disks or ring segments spot-welded or bolted together along their length. To facility this manufacturing approach, a plurality of cutouts 140 may be formed in the outer circumference of the each thin disk. Eighteen such cutouts 140 are shown in FIG. 7, but any suitable number may be used to facilitate the manufacturing process. Many such identical disks may be stacked to form the length of the separation chamber 100. To hold all of the disks in alignment such that the V-shaped groove 128 is formed smoothly in the interior of the separation chamber 100, an alignment bar (not shown) may be inserted into each of the cutouts 140 along the entire length of the separation chamber 100. Once all of the thin disks are held in precise alignment, the disks may be welded along the exterior to form a unitary separation chamber 100. Alternatively, a support jig (not shown) may clamp the plurality of ring segments together along the cutouts 140 to facilitate welding in place.

It should be understood that the invention and its various embodiments are not limited in its application to the details of construction and arrangements of the components set forth herein. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A separation assembly for a food product separating machine configured to separate meat product from bone product, the assembly comprising:
   a chamber defined by a circumferential side wall, a longitudinal axis, and a radius;
   a plurality of apertures disposed in the circumferential side wall;
   at least one V-shaped groove disposed along an inner surface of the circumferential side wall, the V-shaped groove defined by a vertex, two legs extending from the vertex, and an angle bisector of the vertex; and
   the V-shaped groove formed in the inner surface of the circumferential side wall.

2. The assembly of claim 1, wherein the angle bisector of the V-shaped groove is tilted relative to the radius of the chamber.

3. The assembly of claim 1, wherein the two legs correspond to a shorter leg and a longer leg, wherein the shorter leg is aligned along the radius of the chamber.

4. The assembly of claim 1, wherein the V-shaped groove subtends an angle of between 25 degrees and 100 degrees.

5. The assembly of claim 1, wherein the V-shaped groove subtends an angle of about 60 degrees.

6. The assembly of claim 1, wherein the angle bisector is tilted at an angle of between 0 degrees and 45 degrees relative to the radius of the chamber.

7. The assembly of claim 1, wherein the V-shaped groove runs parallel to the longitudinal axis of the chamber along a length of the V-shaped groove.

8. The assembly of claim 1, wherein the V-shaped groove is helical along a length of the chamber.

9. The assembly of claim 1, wherein the V-shaped groove has a constant cross-sectional shape along its length.

10. The assembly of claim 1, wherein the chamber is cylindrical has a constant diameter along its length.

11. The assembly of claim 1, wherein the chamber has a conical shape and tapers from an upstream location toward a downstream location.

12. The assembly of claim 1, wherein the plurality of apertures disposed in the circumferential side wall are rectangular or slot-like.

13. The assembly of claim 11, wherein the plurality of apertures are arranged as columns of slots along the axial length of the chamber, the columns disposed about a circumference of the chamber.

14. The assembly of claim 1, wherein the plurality of apertures disposed in the circumferential side wall are round or polygonal.

15. The assembly of claim 1, wherein the at least one V-shaped groove runs along substantially an entire length of the chamber.

16. A separation assembly for a food product separating machine configured to separate meat product from bone product, the assembly comprising:
    a chamber defined by a circumferential side wall, a longitudinal axis, and a radius;
    a plurality of apertures disposed in the circumferential side wall;
    a plurality of V-shaped grooves disposed along an inner surface of the circumferential side wall, each V-shaped groove defined by a vertex and an angle bisector of the vertex; and
    the V-shaped grooves formed in the inner surface of the circumferential side wall.

17. The assembly of claim 16, wherein the angle bisector of at least one of the plurality of V-shaped grooves is tilted relative to the radius of the chamber.

18. The assembly of claim 16, wherein the angle bisector of each of the V-shaped grooves is tilted relative to the radius of the chamber.

19. The assembly of claim 16, wherein the V-shaped grooves run parallel to the longitudinal axis of the chamber along a length of the V-shaped grooves.

20. The assembly of claim 16, wherein the V-shaped grooves are helical along a length of the chamber.

21. The assembly of claim 16, wherein the chamber is cylindrical has a constant diameter along its length.

22. The assembly of claim 16, wherein the chamber has a conical shape and tapers from an upstream location toward a downstream location.

23. A food product separating machine configured to separate meat product from bone product in a mixed food product, the separating machine comprising:
    a food hopper configured to contain the mixed food product and dispense the mixed food product from a hopper outlet disposed toward a bottom portion of the food hopper;
    an auger in communication with the hopper outlet and configured to receive the mixed food product dispensed from the hopper outlet at an upstream portion of the auger;
    a hollow chamber configured to receive a portion of the auger therein, the cylindrical chamber defined by a circumferential side wall, a longitudinal axis, and a radius;
    the chamber further comprising:
       a plurality of apertures disposed in the circumferential side wall;
       a plurality of V-shaped grooves disposed along an inner surface of the circumferential side wall, the V-shaped grooves defined by a vertex and an angle bisector of the vertex; and
       the V-shaped grooves formed in the inner surface of the circumferential sidewall.

24. The assembly of claim 23, wherein the angle bisector of at least one of the plurality of V-shaped grooves is tilted relative to the radius of the chamber.

25. A separation assembly for a food product separating machine configured to separate meat product from bone product, the assembly comprising:
    a separation chamber defined by a circumferential side wall, a longitudinal axis, and a radius;
    a plurality of apertures disposed in the circumferential side wall to facilitate passing of the meat product therethrough under pressure induced by an auger rotating within the separation chamber;

at least one V-shaped groove disposed along an inner surface of the circumferential side wall, the V-shaped groove defined by a vertex, two legs extending from the vertex, and an angle bisector of the vertex; and the V-shaped groove formed in the inner surface of the circumferential side wall.

26. The assembly of claim 25, wherein the angle bisector of at least one of the plurality of V-shaped grooves is tilted relative to the radius of the chamber.

* * * * *